United States Patent Office 3,500,504
Patented Mar. 17, 1970

3,500,504
METHOD AND APPARATUS FOR PRODUCING SLIVER DIRECTLY FROM TOW
Noboru Oguchi and Takashi Hiramatsu, Nagoya-shi, Japan, assignors to Mitsubishi Rayon Company Limited, Tokyo, Japan, a company of Japan
Filed June 27, 1967, Ser. No. 649,284
Claims priority, application Japan, Aug. 19, 1966, 41/54,596; Aug. 27, 1966, 41/56,308
Int. Cl. D01g 1/00
U.S. Cl. 19—.37                         6 Claims

ABSTRACT OF THE DISCLOSURE

Sliver is produced directly from tow by providing a pair of breaker rollers between the usual feed rollers and delivery rollers. The breaker rollers are rotated at a higher peripheral speed than the delivery rollers and have intermeshing blades which sever a first portion of filaments of the tow, abrade a second portion of filaments of the tow to form weakened zones in which said filaments are broken by the draft of the delivery rollers and leave a third portion of the filaments in the tow uncut and unabraded whereupon they are broken at random points by the draft of the delivery rollers.

---

Figure 1:
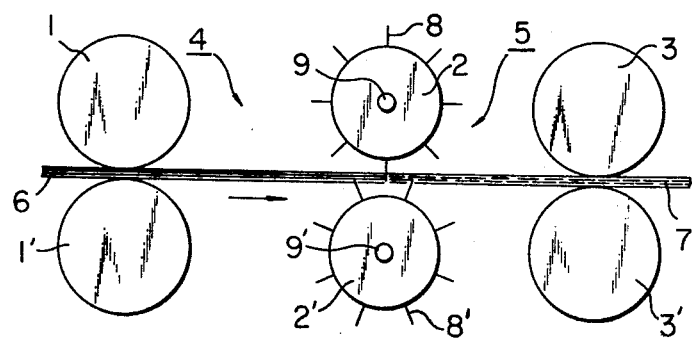

The present invention relates to an improved method and apparatus for producing sliver directly from tow and, particularly relates to an improved method and apparatus for producing sliver directly from tow characterized by means for decreasing the breaking force by excess draft disposed in a draft zone of a conventional draft break system.

There are various conventional methods for producing sliver directly from tow. In the Perlok system, which is one of the typical methods for producing sliver directly from tow, this is performed by means of feeding tow to a pair of feed rollers, giving a high draft ratio to the bundle of filaments within a zone between a pair of feed rollers and a pair of delivery rollers, breaking the fed filaments randomly at the portion adjacent to the delivery rollers and then delivering produced sliver composed of the above-mentioned broken fibers from a pair of delivery rollers.

The Turbo-stapler system is another typical example of the conventional methods. In this system, direct formation of sliver from tow is performed by means of feeding tow to a pair of feed rollers, providing weak points in a portion of the respective filaments, forming the bundle of filaments by a pair of breaker bars, breaking the filaments at their weak points by applying a high degree of stretching force to the bundle of filaments within the zone between the breaker bars and a pair of delivery rollers, and delivering the produced sliver from a pair of delivery rollers.

In case of the former system the denier of the tow fed to the system is limited, because it requires a high degree of breaking force to stretch it beyond the breaking elongation, in other words, higher degree of break force is necessary to produce sliver directly from tow of higher denier in this system.

In case of the latter system it can be expected that theoretically all of the filaments in the bundle of filaments are broken at their weak points. Actually, the bundle of filaments has some thickness, consequently the operation of the breaker bars is applied only to the group of filaments in the bundle which contact the blades directly, and the remaining group of filaments must be broken by means of stretching beyond their breaking elongation so as to break fibers (hereinafter called "draft break"), by which the denier of the tow fed to the system is also limited.

The principal object of the present invention is to provide an improved method and apparatus for producing sliver directly from tow characterized by means for decreasing the breaking force and having at least one pair of additional rotating rollers provided with breaker blades on its surface positioned in the draft zone. Then breaking filaments of the tow by means of the breaker blades before the filaments are positively nipped by delivery rollers and thereby reducing the breaking force required in the direct formation of sliver from tow.

Another object of the present invention is to provide an improved method and apparatus for producing sliver directly from tow of higher denier at a higher operating efficiency.

A further object of the present invention is to provide an improved method and apparatus for producing sliver directly from tow and having excellent quality.

Still further an object of the present invention is to provide an improved method and apparatus for producing sliver directly from tow having increased thickness with increased productivity.

The present invention will be better understood from the following description taken in connection with the accompanying drawings wherein a preferred embodiment of the present invention is clearly shown.

Figure 2:
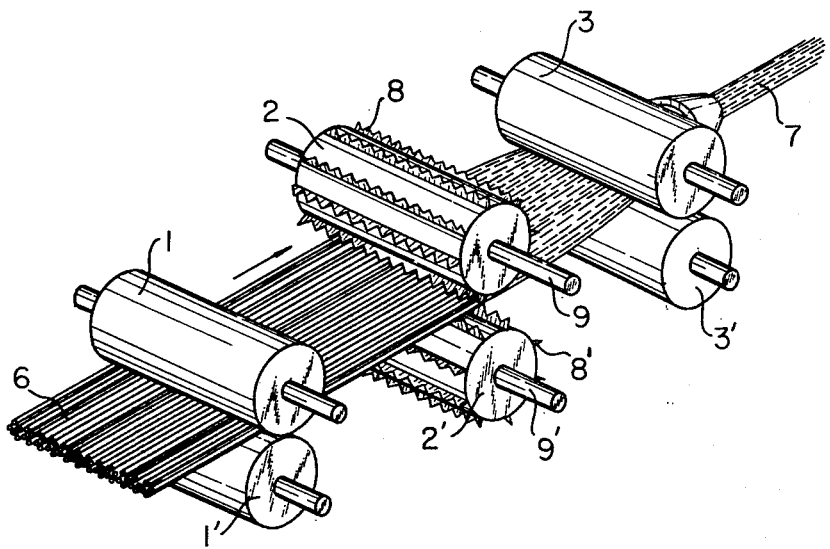
Figure 3:
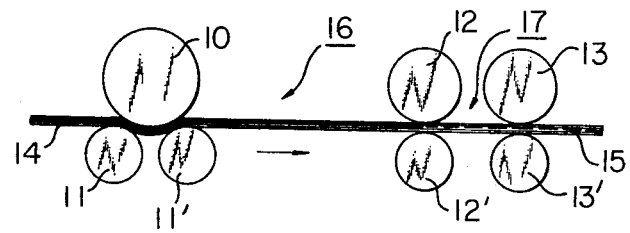
Figure 4:
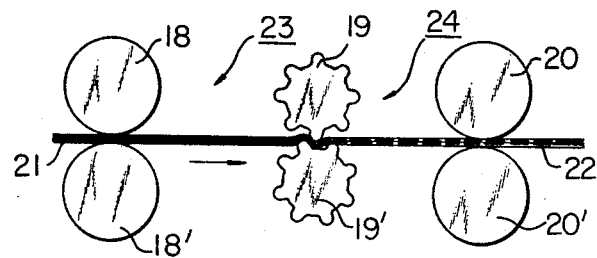
Figure 5:
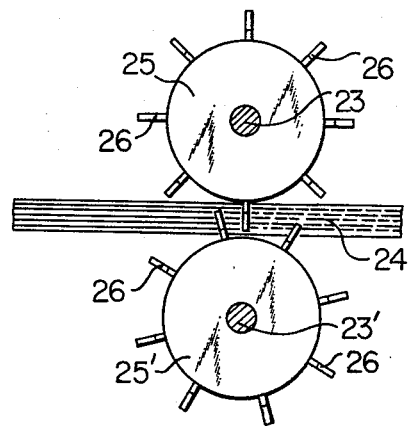
Figure 6A:
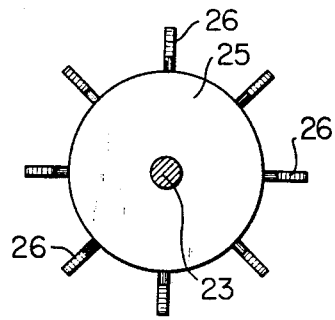
Figure 6B:
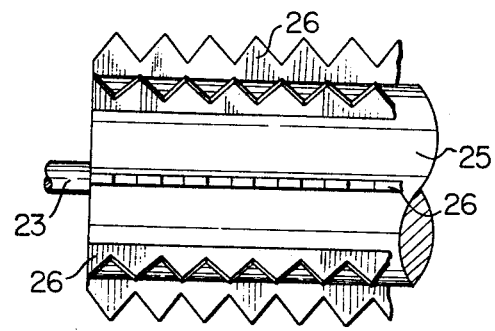
Figure 13:
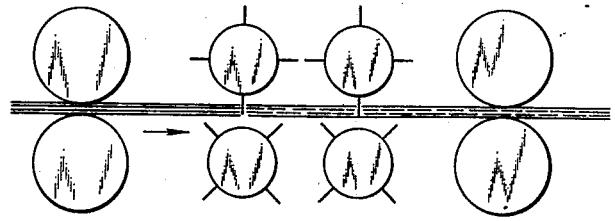

FIG. 1 is a section skeleton of the main portion of the direct tow-to-sliver forming apparatus of the present invention, FIG. 2 is a perspective view of the direct tow-to-sliver forming apparatus shown in FIG. 1, FIG. 3 is a section skeleton of the main portion of the prior art Perlock spinning system, FIG. 4 is a section skeleton of the portion of breaker bars of the prior art Turbo-stapler spinning system, FIGS. 5, 6A and 6B are schematic side views of the additional rotating rollers provided with breaker blades of the present invention, FIGS. 7A, 7B, 8A, 8B, 9A and 9B are embodiments for the shape of breaker blades secured to the additional rotating rollers of the present invention, FIGS. 10A, 10B, 11A, 11B, 12A and 12B show the shape of breaker blades of another embodiment secured to the additional rotating rollers of the present invention, FIG. 13 is a section skeleton of a still another embodiment of the present invention characterized by two pairs of additional rotating rollers with breaker blades positioned within the zone between a pair of feed rollers and a pair of delivery rollers.

Referring to FIGS. 1 and 2, a pair of additional rotating rollers 2, 2' are provided with specially designed breaker blades 8, 8' and supported by the respective shafts 9, 9'. The rollers are positioned in a conditioning zone or draft zone 4, 5 between a pair of feed rollers 1, 1' and a pair of delivery rollers 3, 3' in such a manner that the blades 8, 8' contact the bundle of passing filaments or tow 6 from above and below the path of the bundle 6 to break filaments in the bundle 6 while the additional rotating rollers 2, 2' rotate around the respective shafts 9, 9'. The bundle of filaments 6 is supplied to the apparatus through a pair of feed rollers 1, 1' in the form of tow and after receiving the breaking operation of the breaker blades 8, 8' of the additional rotating rollers 2, 2', it is delivered from the apparatus through delivery rollers 3, 3' in the form of a web of staple fibers and gathered into a sliver 7 by a trumpet or condenser positioned downstream of the delivery rollers 3 and 3'.

Direct production of sliver from tow in the present invention comprises three types of filament breaking techniques. A portion of filaments in the tow 6 do not receive the breaking operation of the breaker blades 8, 8', but are cut only by means of draft breaking within the zone 5 between the additional rollers 2, 2' and the delivery rollers 3, 3'. Broken fibers belonging to this group are called group I in the following description. Another portion of filaments in the tow 6 are provided with weakened zones by the operation of breaker blades 8 and are broken means of draft force within the zone 5 between the additional rollers 2, 2' and the delivery rollers 3, 3'. Broken fibers belonging to this group are called group II in the following description. The remaining portion of filaments in the tow 6 are cut directly by the cutting operation of the blades 8, 8'. Cut fibers belonging to this group are called group III in the following description.

Certain filaments of the tow are subjected to rubbing action of the blades 8, 8' which move in the axial direction of the filaments at a speed higher than that of the filaments. The length of each rubbed portion of the individual filaments and the intervals between the adjacent rubbed portions vary according as the peripheral speed of the blades 8, 8' is changed. However, each rubbed portion of the filaments actually appears as an extended portion distributed along the filaments axis, and there is a possibility of double rubbing action on the filaments caused by the slower relative speed of the tow to the peripheral speed of the blades 8, 8'. By the mechanical rubbing action of the blades 8, 8' the filaments are weakened at their rubbed portions, The weakened condition of the filaments varies in wide range, for example, from a condition of slight degradation of tensile strength to a condition of complete breakdown. The filaments still having a certain portion of their own tensile strength correspond to the above-mentioned fibers of group II while the broken fibers belong to the above-mentioned group III.

The above-mentioned degradation of the tensile strength of the filaments can be theoretically analyzed as an event of probability, on other words, the weakened portions caused by the above-mentioned abrasion are microscopically distributed with certain intervals along the filaments and the weak points of the filaments are microscopically randomly distributed in the rubbed portion of filaments, under the laws of probability. Further, there are certain filaments which are not abraded by the blades 8, 8'. This group of filaments corresponds to the above-mentioned fibers of group I.

By the theoretical and practical analysis of the applicant, it was found that the breakdown points of filaments of tow 6 at the position just before the delivery rollers 3, 3' varies at random. (The detailed information of this research was reported in Journal of the Textile Machinery Society of Japan, vol. 20, T250, 1967.)

Consequently, the sliver produced comprises fibers of group III having almost uniform length, fibers of group II having lengths which are randomly varied in a certain range of fiber length, and fibers of group I having random fiber length. The cutting and the breaking of filaments occur independently; consequently, the alignment of fibers in the sliver is in side by side relationship to each other.

Referring to FIG. 3, the conventional Perlok system comprises a feed roller 10 accompanied by two bottom rollers 11, 11' and a pair of middle rollers 12, 12' positioned adjacent to a pair of delivery rollers 13, 13'. The bundle of filaments of the fed tow 14 provide break draft within the zone 16 between the feed roller 10 and the middle rollers 12, 12' and then is given a second draft within the zone 17 between the middle rollers 12, 12' and the delivery rollers 13, 13' to bestow sufficient force for draft breaking of fibers, which is necessary to produce sliver 15.

The sliver produced by the method of the present invention comprises mainly cut fibers of group III, while the sliver produced by the conventional Perlok system comprises mainly broken fibers of group I because they are not provided with an additional breaking member such as that of the present invention.

Referring to FIG. 4, in the conventional Turbo-stapler, the main portion comprises a pair of feed rollers 18, 18' and a pair of rotating breaker bars 19, 19' positioned between the feed rollers 18, 18' and a pair of delivery rollers 20, 20'. The bundle of filaments of the fed tow 21 is stretched within the zone 23 between the feed rollers 18, 18' and the breaker bars 19, 19' and is provided with weak points or zones by the operation of the breaker bars 19, 19' and a portion of filaments in the bundle are broken at their weak points by the high degree of stretching force within the zone 24 between the breaker bars 19, 19' and the delivery rollers 20, 20' to form sliver 22.

It is well-known that the essential object of Turbo-stapler system is to produce sliver comprising mainly broken fibers of group II. However, in actual practice, some portion of filaments in the bundle having thickness do not contact the breaker bars and as they are brought to the delivery rollers without receiving the effect of the breaker bars, it is necessary to break them by means of draft breaking within the zone 24 between the breaker bars 19, 19' and the delivery rollers 20, 20'. Consequently, the sliver produced by the conventional Turbo-stapler system comprises broken fibers of group I together with broken fibers of group II.

It is evident from the above description that the draft breaking operation of filament requires a high degree of stretching force than the force to nip the bundle of sliver to avoid the slippage of filaments in the bundle. Consequently, power consumption of the machine for this draft breaking operation is large and the power consumption is further increased by driving the machine under a loaded condition as already described. Furthermore, limitation in denier to fed tow results in the limitation in the production capacity of the machine. Consequently, it is difficult to expect higher production speed in case of such a draft breaking system as the Perlok system.

In case of the Turbo-stapler system, filaments are broken after weak points have been provided by the operation of breaker bars and this means that the amount of force required to break a single filament can be smaller than the force required in case of the so-called draft break system. Consequently, it can be concluded that theoretically, the amount of breaking force required in this system is far smaller than that in the Perlok system in case there is no difference in the denier of fed tow and the delivered sliver in both systems.

Nevertheless, a large breaking force is required even in a Turbo-stapler because of the presence of broken fibers of group I. In other words, it is not possible to ignore the existence of a group of fibers which are carried into the zone 24 between the breaker bars 19, 19' and the delivery rollers 20, 20' and are broken only by means of a draft breaking operation without providing weak points on them by the breaker bars when complete breaking operation is not obtained by appropriate mechanical condition which is actually difficult to find.

This is also evident from the fact that it is possible to find the maximum denier of the tow that can be broken by means of the breaking operation of the system by increasing gradually the denier of the tow fed to the system. As the thickness of the tow fed to the system increases, the amount of filaments which is positioned in the inner portion of the bundle of filaments increases accordingly. Filaments of this group pass through the breaking members without being provided with weak points by means of the operation of the breaking members. Consequently, as the denier of the tow fed to the system increases, the amount of breaking force required to break filaments in the tow increases accordingly. When the amount of breaking force required for the breaking of filaments in the tow exceeds the amount of breaking force which can be provided under the mechanical condition of the system, it becomes rather difficult to produce sliver with the preferable staple diagram, irregulating of sliver thickness and without nips directly from tow in the system.

If the width of the tow fed to the system is reduced without changing its total denier, the thickness of the tow evidently increases. Consequently, by gradually reducing the width of fed tow of a definite denier, we can finally find the maximum number of filaments per centimeter width of fed tow, beyond which it is impossible to cut filaments in the bundle of filaments completely.

For the convenience of estimating the breaking ability in each system, the above-described maximum number of filaments per centimeter width of the tow fed to the system is called "maximum breakable number of filaments" in the following descriptions.

EXAMPLE 1

System—Turbo-stapler system.
Tow—Acrylic synthetic filament, $3^d/160,000^f$.
Width of fed tow—200 mm.
Heater—Single type.
Temperature of heater—425° F.
Heater gauge—2 mm.
Stretch ratio—1.31.
Break draft—3.31.
Breaker bar draft—1.46.
Breaker bar gauge—4 mm.
Breaker ratch—178 mm.
Maximum breakable number of filaments—$11,000^f \times 3^d$.

According to the principal mechanism of the present invention, positive formation of cut fibers of group III is the most important element of the process of the system. But, if all of the filaments in the fed tow are cut completely and converted into the cut fibers of group III, the bundle of filaments is broken completely and is difficult to be nipped by the delivery rollers, and as a result, the production of sliver cannot be completed. Therefore, formation of broken fibers of group II does not interfere with the formation of cut fibers of group III though it is not the main element in the process.

Broken fibers of group I is only an auxiliary element for carrying cut fibers of group III to the delivery rollers smoothly. Consequently, the breaking force required for breaking filaments in the system of the present invention is far smaller than that in the Perlok system and the Turbo-stapler system, and this means a corresponding increase in the production capacity of the machine.

Referring to FIGS. 5, 6A and 6B, the breaking members of the present invention comprises, in combination, a pair of driving shafts 23, 23' positioned above and under the path of the bundle of filaments 24, respectively, in such a manner that the direction of the shafts meets the direction of the bundle of filaments 24 at right angles, a pair of additional rotating rollers 25, 25', supported by the shafts 23, 23', respectively, and a plurality of breaker blades 26, made of metal or porcelain containing alundum or carborundum, secured to the surface of the rollers 25, 25', with equal superficial distances to each other and parallel to the shaft 23, 23'. The breaker blades 26 are arranged in such a manner that the end portion of the blades 26 contact the bundle of filaments 24 in order to break filaments in the bundle 24.

It is possible to increase the amount of filaments which receive the operation of the breaker blades 26 by increasing effective contacting surface of the breaker blades 26 to the bundle of filaments 24. A portion of filaments in the bundle of filaments 24 are converted into cut fibers of group III by means of the breaking operation of the breaker blades 26. The larger the amount of cut fibers of group III in the bundle of filaments 24, the smaller is the breaking force required in the system. Thus, reduced breaking force results in an increase in the unit production capacity of the machine.

Figure 7A:
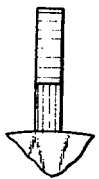
Figure 7B:
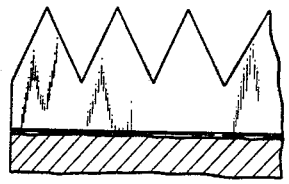
Figure 8A:
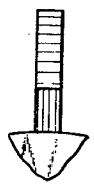
Figure 8B:
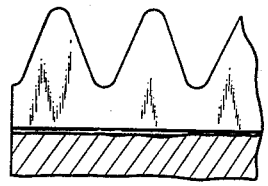
Figure 9A:
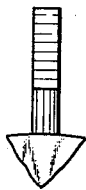
Figure 9B:
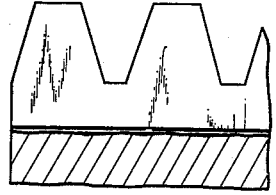
Figure 10A:
Figure 11A:
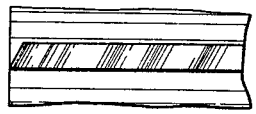
Figure 10B:
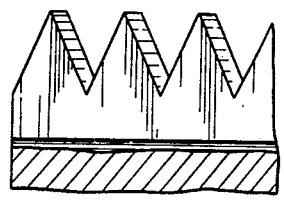
Figure 11B:
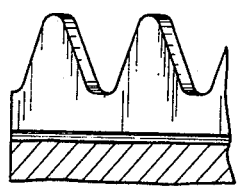
Figure 12A:
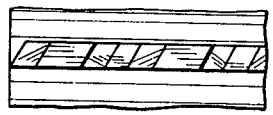
Figure 12B:
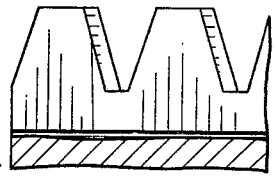

An embodiment of the apparatus of the present invention is shown in FIGS. 7A and 7B, wherein the teeth of the breaker blades 26 are formed in a triangular shape so as to increase the effective contacting surface of the breaker blades 26 and to enhance the fiber distribution effect by the breaker blades.

EXAMPLE 2

System—System of the present invention.
Mechanical conditions—Same as that in Example 1.
Additional breaking roller—One pair, positioned above and under the path of the bundle of filaments, respectively.
Position of the rollers—178 mm. from nip point of the delivery rollers.
Relative position of the blades—Shown in FIGS. 6A and 6B.
Number of blades—8 blades on a roller.
Superficial speed of the additional rollers—Same as that of the delivery rollers.
Maximum breakable number of filaments—$18,900^f \times 3^d$.

Other embodiments of the apparatus of the present invention are shown in FIGS. 8A, 8B, 9A and 9B, wherein the teeth of the breaker blades 26 are formed in the shape of a wave and a trapezoid so as to increase the effective contacting surface of the breaker blades 26 and to enhance the fiber distribution effect by the breaker blades.

Further embodiments of the apparatus of the present invention are shown in FIGS. 10A, 10B, 11A, 11B, 12A and 12B, wherein the teeth of the breaker blades 26 are inclined in such a manner that planes defined by edge faces of the teeth intersect the axes of the shafts 23, 23' supporting the additional rotating rollers 25, 25' at a certain angles so as to increase the effective contacting surface of the breaker blades 26 and to enhance the fiber distribution effect by the breaker blades.

It is also possible to increase the amount of cut fibers of group III and to reduce the amount of breaking force as described in the Example 2 by means of making the superficial speed of the additional rollers higher than that of the delivery rollers.

EXAMPLE 3

System—System of the present invention.
Mechanical conditions—Same as that in Example 1.
Additional rotating roller—One pair, positioned above and under the path of the bundle of filament, respectively.
Position of the rollers—178 mm. from nip point of the delivery rollers.
Relative position of the blades—Same as that in Example 2.
Number of blades—8 blades on a roller.
Ratio of superficial speed of the additional rollers against that of the delivery rollers—1/0.6, 1/0.8, 1/0.9.
Maximum breakable number of filaments—$20,000^f \times 3^d$, $17,800^f \times 3^d$, $14,600^f \times 3^d$.

It is further possible to increase the amount of cut fibers of group III and to reduce the amount of breaking force, as described in the Example 2, by positioning more than two pairs of additional rotating rollers, provided with the above described cutter blades, within the zone between the feed rollers and the delivery rollers.

EXAMPLE 4

System—System of the present invention.
Mechanical conditions—Same as that in Example 1.
Additional rotating roller—Two pairs, positioned above and under the path of the bundle of filaments, respectively.
Position of the rollers—One pair of rollers 178 mm. and another pair of rollers 30 mm., respectively, from nip point of the delivery rollers.
Relative position of the blades—Same as that in Example 2.
Number of blades—4 blades on a roller.

Superficial speed of the additional rollers—Same as that of the delivery rollers.
Maximum breakable number of filaments—20,000$^f$×3$^d$.

It is further possible to increase the amount of the broken fibers of group III and to reduce the amount of breaking force by making the superficial speed of the additional rollers higher than that of the delivery rollers in the system of Example 4.

EXAMPLE 5

System—System of the present invention.
Mechanical conditions—Same as that in Example 1.
Additional rotating rollers—Two pairs, positioned above and under the path the bundle of filaments, respectively.
Position of the rollers—Same as that in Example 4.
Relative position of the blades—Same as that in Example 4.
Number of blades—4 blades on a roller.
Superficial speed of the additional rollers—1/0.9 of that of the delivery rollers.
Maximum breakable number of filaments—18,900$^f$×3$^d$.

While the invention has been described in conjunction with certain embodiments thereof, it is to be understood that various modification and changes may be made without departing from the spirit and scope of the invention.

What is claimed is:

1. A method of producing sliver directly from tow which comprises passing said tow between a pair of feed rollers and a pair of delivery rollers spaced from said feed rollers and driven at a higher peripheral speed than said feed rollers, cutting a first portion of filaments in said tow between said feed rollers and delivery rollers, abrading a second portion of filaments in said tow to form weakened zones in filaments of said second portion whereupon said filaments are broken in said weakened zones by the draft of said delivery rollers and leaving a third portion of filaments in said tow uncut and unabraded whereupon filaments in said third portion are broken at random points by the draft of said delivery rollers.

2. A method according to claim 1 in which said cutting and abrading are effected by engaging filaments of said tow in a zone between said feed rollers and said delivery rollers by rotating breaker blades moving at a speed higher than the peripheral speed of said delivery rollers.

3. An apparatus for conditioning a bundle of filaments and having feeding means for feeding a bundle of filaments to a conditioning zone and delivery means disposed downstream from said feeding means for delivering said bundle of filaments from said conditioning zone; the improvement which comprises means for decreasing the tensile strength of individual filaments of said bundle of filaments including at least one pair of additional rotatably mounted rollers disposed in said conditioning zone, said additional rotatably mounted rollers each having a plurality of breaker blades longitudinally disposed thereon, each of said breaker blades having a plurality of teeth thereon, and said pair of additional rotatably mounted rollers positioned transverse to said bundle of filaments to receive said bundle of filaments therebetween and to enable said breaker blades to contact said bundle of filaments; whereby said breaker blades contact and abrade said bundle of filaments to decrease the tensile strength of individual filaments during their conveyance.

4. An apparatus according to claim 3, wherein said plurality of teeth have a triangular shape.

5. An apparatus according to claim 3, wherein said plurality of teeth have a wavy shape.

6. An apparatus according to claim 3, wherein said plurality of teeth have a trapezoidal shape.

References Cited

UNITED STATES PATENTS

| 2,920,176 | 1/1960 | Jorgensen | 19—.37 XR |
| 2,976,578 | 3/1961 | Virgil | 19—.37 |
| 2,598,086 | 5/1952 | Kohorn | 19—.6 |

FOREIGN PATENTS 716,043  9/1954  Great Britain.

DORSEY NEWTON, Primary Examiner

U.S. Cl. X.R.

19—.6